(12) United States Patent
D'Mello et al.

(10) Patent No.: US 9,349,013 B2
(45) Date of Patent: May 24, 2016

(54) VULNERABILITY-BASED REMEDIATION SELECTION

(71) Applicant: Fortinet, Inc., Sunnyvale, CA (US)

(72) Inventors: Kurt D'Mello, Fairfax, VA (US); David Spencer Tyree, Centreville, VA (US); Sudhir Gandhe, Fairfax, VA (US)

(73) Assignee: Fortinet, Inc., Sunnyvale, CA (US)

( * ) Notice: Subject to any disclaimer, the term of this patent is extended or adjusted under 35 U.S.C. 154(b) by 0 days.

(21) Appl. No.: 13/969,014

(22) Filed: Aug. 16, 2013

(65) Prior Publication Data

US 2013/0333044 A1 Dec. 12, 2013

Related U.S. Application Data

(63) Continuation of application No. 12/765,431, filed on Apr. 22, 2010, now Pat. No. 8,561,197, which is a continuation of application No. 10/897,402, filed on Jul. 23, 2004, now Pat. No. 7,774,848.

(51) Int. Cl.
*H04L 29/06* (2006.01)
*G06F 21/57* (2013.01)

(52) U.S. Cl.
CPC .............. *G06F 21/577* (2013.01); *G06F 21/57* (2013.01)

(58) Field of Classification Search
CPC ................................................... G06F 21/577
USPC .......................................................... 726/25
See application file for complete search history.

(56) References Cited

U.S. PATENT DOCUMENTS

| 5,557,742 | A  | * | 9/1996  | Smaha ................. G06F 21/554 714/48 |
| 5,850,446 | A  |   | 12/1998 | Berger et al. |
| 6,088,804 | A  |   | 7/2000  | Hill et al. |
| 6,185,689 | B1 | * | 2/2001  | Todd, Sr. ............... G06F 21/577 705/53 |
| 6,282,546 | B1 |   | 8/2001  | Gleichauf et al. |
| 6,301,668 | B1 |   | 10/2001 | Gleichauf et al. |
| 6,385,317 | B1 |   | 5/2002  | Rix et al. |
| 6,389,538 | B1 |   | 5/2002  | Gruse et al. |
| 6,398,245 | B1 |   | 6/2002  | Gruse et al. |
| 6,513,122 | B1 |   | 1/2003  | Magdych et al. |
| 6,546,493 | B1 |   | 4/2003  | Magdych et al. |
| 6,711,127 | B1 |   | 3/2004  | Gorman et al. |

(Continued)

OTHER PUBLICATIONS

Ashley, Mitchell. "Layered Network Security: A best-practices approach." White paper. StillSecure (2006).*

(Continued)

*Primary Examiner* — Harris C Wang
(74) *Attorney, Agent, or Firm* — Law Office of Dorian Cartwright; Dorian Cartwright

(57) ABSTRACT

A machine-actionable memory comprises one or more machine-actionable records arranged according to a data structure. Such a data structure may include links that respectively map between a remediation, at least one action, and at least two vulnerabilities. A method of selecting a remediation, that is appropriate to a vulnerability which is present on a machine to be remediated, may include: providing a machine-actionable memory as mentioned above; and indexing into the memory using: a given vulnerability identifier to determine (A) at least one of a remediation mapped thereto and (B) at least one action mapped to the given vulnerability identifier; and/or a given remediation to determine at least two vulnerabilities mapped thereto.

15 Claims, 9 Drawing Sheets

(56) References Cited

U.S. PATENT DOCUMENTS

| | | |
|---|---|---|
| 6,766,458 B1 | 7/2004 | Harris et al. |
| 6,907,531 B1 | 6/2005 | Dodd et al. |
| 6,912,521 B2 | 6/2005 | Kraft et al. |
| 6,922,686 B2 | 7/2005 | Okamoto et al. |
| 7,000,247 B2 | 2/2006 | Banzhof |
| 7,013,395 B1 | 3/2006 | Swiler et al. |
| 7,143,442 B2 | 11/2006 | Scarfe et al. |
| 7,152,105 B2 | 12/2006 | McClure et al. |
| 7,197,508 B1 | 3/2007 | Brown, III |
| 7,260,844 B1 | 8/2007 | Tidwell et al. |
| 7,278,163 B2 | 10/2007 | Banzhof et al. |
| 7,308,712 B2 | 12/2007 | Banzhof |
| 7,424,706 B2 | 9/2008 | Ivanov et al. |
| 7,694,337 B2 | 4/2010 | D'Mello et al. |
| 7,774,848 B2 | 8/2010 | D'Mello et al. |
| 8,171,555 B2 | 5/2012 | D'Mello et al. |
| 8,561,197 B2 | 10/2013 | D'Mello et al. |
| 8,635,702 B2 | 1/2014 | D'Mello et al. |
| 2002/0026591 A1 | 2/2002 | Hartley et al. |
| 2002/0034302 A1 | 3/2002 | Moriai et al. |
| 2002/0052877 A1 | 5/2002 | Okamoto et al. |
| 2002/0087882 A1 | 7/2002 | Schneier et al. |
| 2002/0104014 A1 | 8/2002 | Zobel et al. |
| 2002/0116630 A1 | 8/2002 | Stehlin |
| 2002/0147803 A1 | 10/2002 | Dodd et al. |
| 2002/0166063 A1 | 11/2002 | Lachman, III et al. |
| 2002/0188861 A1 | 12/2002 | Townsend |
| 2003/0009694 A1 | 1/2003 | Wenocur et al. |
| 2003/0037142 A1 | 2/2003 | Munger et al. |
| 2003/0065945 A1 | 4/2003 | Lingafelt et al. |
| 2003/0093669 A1 | 5/2003 | Morais et al. |
| 2003/0115147 A1 | 6/2003 | Feldman et al. |
| 2003/0115483 A1 | 6/2003 | Liang |
| 2003/0126010 A1 | 7/2003 | Barns-Slavin |
| 2003/0126472 A1 | 7/2003 | Banzhof |
| 2003/0131256 A1 | 7/2003 | Ackroyd |
| 2003/0135749 A1 | 7/2003 | Gales et al. |
| 2003/0140250 A1 | 7/2003 | Taninaka et al. |
| 2003/0159060 A1 | 8/2003 | Gales et al. |
| 2003/0163697 A1 | 8/2003 | Pabla et al. |
| 2003/0204495 A1 | 10/2003 | Lehnert |
| 2003/0204498 A1 | 10/2003 | Lehnert |
| 2004/0025043 A1 | 2/2004 | Gallagher et al. |
| 2004/0064722 A1 | 4/2004 | Neelay et al. |
| 2004/0064726 A1 | 4/2004 | Girouard |
| 2004/0088565 A1 | 5/2004 | Norman et al. |
| 2004/0088581 A1 | 5/2004 | Brawn et al. |
| 2004/0111613 A1 | 6/2004 | Shen-Orr et al. |
| 2004/0143749 A1 | 7/2004 | Tajalli et al. |
| 2004/0221176 A1 | 11/2004 | Cole |
| 2004/0249712 A1 | 12/2004 | Brown et al. |
| 2005/0005162 A1 | 1/2005 | Oliphant |
| 2005/0022021 A1* | 1/2005 | Bardsley ............... G06F 21/577 726/4 |
| 2005/0160480 A1 | 7/2005 | Birt et al. |
| 2005/0229256 A2 | 10/2005 | Banzhof |
| 2006/0004800 A1 | 1/2006 | Okamoto et al. |
| 2006/0010497 A1* | 1/2006 | O'Brien ................. G06Q 10/10 726/26 |
| 2006/0018478 A1 | 1/2006 | Diefenderfer et al. |
| 2006/0018485 A1 | 1/2006 | Diefenderfer et al. |
| 2006/0021051 A1 | 1/2006 | D'Mello et al. |
| 2006/0021052 A1 | 1/2006 | D'Mello et al. |
| 2006/0021053 A1 | 1/2006 | D'Mello et al. |
| 2006/0053134 A1 | 3/2006 | Durham et al. |
| 2006/0053265 A1 | 3/2006 | Durham et al. |
| 2006/0053475 A1 | 3/2006 | Bezilla et al. |
| 2006/0080738 A1 | 4/2006 | Bezilla |
| 2006/0095792 A1 | 5/2006 | Hurtado et al. |
| 2006/0259779 A2 | 11/2006 | Oliphant |
| 2006/0259972 A2 | 11/2006 | Oliphant |
| 2007/0136622 A1* | 6/2007 | Price ....................... G06Q 10/10 714/25 |
| 2007/0192867 A1 | 8/2007 | Miliefsky |
| 2007/0256132 A2 | 11/2007 | Oliphant |
| 2009/0119777 A1 | 5/2009 | Jeon |
| 2009/0199298 A1 | 8/2009 | Miliefsky |
| 2010/0199353 A1 | 8/2010 | D'Mello et al. |
| 2012/0192281 A1 | 7/2012 | D'Mello et al. |

OTHER PUBLICATIONS

"Anti-Vulnerability—Intrusion Detection System (IDS)", Security Profiling, Inc., White Paper Version 1.0, Rev. A, [Online]. [Archived Apr. 9, 2003]. Retrieved from the Internet: <URL: http://web.archive.org/web/20030409162639/www.securityprofiling.com/pdf/IDSPaperv1-0.pdf>, (Apr. 9, 2003), 37 pgs.

"U.S. Appl. No. 10/897,399, Final Office Action mailed Feb. 3, 2009", 13 pgs.

"U.S. Appl. No. 10/897,399, Non Final Office Action mailed Mar. 17, 2011", 9 pgs.

"U.S. Appl. No. 10/897,399, Non-Final Office Action mailed Aug. 4, 2008", 13 pgs.

"U.S. Appl. No. 10/897,399, Non-Final Office Action mailed Aug. 6, 2009", 14 pgs.

"U.S. Appl. No. 10/897,399, Notice of Allowance mailed Oct. 11, 2011", 9 pgs.

"U.S. Appl. No. 10/897,399, Notice of Allowance mailed Dec. 28, 2011", 11 pgs.

"U.S. Appl. No. 10/897,399, Response filed Apr. 5, 2010 to Non Final Office Action mailed Aug. 6, 2009", 10 pgs.

"U.S. Appl. No. 10/897,399, Response filed May 1, 2008 to Restriction Requirement mailed Apr. 3, 2008", 1 pg.

"U.S. Appl. No. 10/897,399, Response filed May 28, 2009 to Final Office Action mailed Feb. 3, 2009", 9 pgs.

"U.S. Appl. No. 10/897,399, Response filed Jul. 18, 2011 to Non Final Office Action mailed Mar. 17, 2011", 7 pgs.

"U.S. Appl. No. 10/897,399, Response filed Nov. 4, 2008 to Non-Final Office Action mailed Aug. 4, 2008", 12 pgs.

"U.S. Appl. No. 10/897,399, Restriction Requirement mailed Apr. 3, 2008", 5 pgs.

"U.S. Appl. No. 10/897,402, 312 Amendment filed Apr. 13, 2010", 2 pgs.

"U.S. Appl. No. 10/897,402, Final Office Action mailed May 5, 2008", 11 pgs.

"U.S. Appl. No. 10/897,402, Final Office Action mailed May 27, 2009", 15 pgs.

"U.S. Appl. No. 10/897,402, Non-Final Office Action mailed Oct. 10, 2007", 12 pgs.

"U.S. Appl. No. 10/897,402, Non-Final Office Action mailed Oct. 29, 2008", 15 pgs.

"U.S. Appl. No. 10/897,402, Notice of Allowance mailed Jan. 14, 2010", 7 pgs.

"U.S. Appl. No. 10/897,402, PTO Response to 312 Amendment mailed May 20, 2010", 2 pgs.

"U.S. Appl. No. 10/897,402, Response filed Feb. 8, 2008 to Non-Final Office Action mailed Oct. 10, 2007", 13 pgs.

"U.S. Appl. No. 10/897,402, Response filed Mar. 3, 2009 to Non-Final Office Action mailed Oct. 29, 2008", 12 pgs.

"U.S. Appl. No. 10/897,402, Response filed Aug. 5, 2008 to Final Office Action mailed May 8, 2008", 14 pgs.

"U.S. Appl. No. 10/897,402, Response filed Oct. 27, 2009 to Final Office Action mailed May 27, 2009", 15 pgs.

"U.S. Appl. No. 10/933,504, Non Final Office Action mailed Mar. 4, 2009", 18 pgs.

"U.S. Appl. No. 10/933,504, Non-Final Office Action mailed May 13, 2008", 14 pgs.

"U.S. Appl. No. 10/933,504, Notice of Allowance mailed Aug. 4, 2009", 6 pgs.

"U.S. Appl. No. 10/933,504, Preliminary Amendment mailed Dec. 16, 2004", 13 pgs.

"U.S. Appl. No. 10/933,504, Response filed Jun. 3, 2009 to Non Final Office Action mailed Mar. 4, 2009", 13 pgs.

"U.S. Appl. No. 10/933,504, Response filed Nov. 12, 2008 to Non-Final Office Action mailed May 13, 2008", 14 pgs.

"U.S. Appl. No. 10/933,505, Final Office Action mailed Mar. 4, 2009", 11 pgs.

(56) References Cited

OTHER PUBLICATIONS

"U.S. Appl. No. 10/933,505, Non-Final Office Action mailed Jun. 20, 2008", 9 pgs.
"U.S. Appl. No. 10/933,505, Non-Final Office Action mailed Aug. 20, 2009", 12 pgs.
"U.S. Appl. No. 10/933,505, Response filed Jun. 2, 2009 to Final Office Action mailed Mar. 4, 2009", 9 pgs.
"U.S. Appl. No. 10/933,505, Response filed Nov. 20, 2008 to Non-Final Office Action mailed Jun. 20, 2008", 9 pgs.
"U.S. Appl. No. 10/944,406, Final Office Action mailed Oct. 29, 2008", 19 pgs.
"U.S. Appl. No. 10/944,406, Non-Final Office Action mailed Mar. 28, 2008", 10 pgs.
"U.S. Appl. No. 10/944,406, Notice of Allowance mailed Nov. 17, 2009", 13 pgs.
"U.S. Appl. No. 10/944,406, Response filed Jun. 26, 2009 to Final Office Action mailed Oct. 29, 2008", 15 pgs.
"U.S. Appl. No. 10/944,406, Response filed Jun. 29, 2008 to Non-Final Office Action mailed Mar. 28, 2008", 17 pgs.
"U.S. Appl. No. 10/963,766, Advisory Action mailed Jul. 25, 2008", 3 pgs.
"U.S. Appl. No. 10/963,766, Final Office Action mailed Mar. 10, 2009", 24 pgs.
"U.S. Appl. No. 10/963,766, Final Office Action mailed May 15, 2008", 15 pgs.
"U.S. Appl. No. 10/963,766, Non-Final Office Action mailed Sep. 29, 2008", 19 pgs.
"U.S. Appl. No. 10/963,766, Non-Final Office Action mailed Dec. 6, 2007", 18 pgs.
"U.S. Appl. No. 10/963,766, Preliminary Amendment mailed Apr. 14, 2005", 7 pgs.
"U.S. Appl. No. 10/963,766, Response filed Mar. 6, 2008 to Non-Final Office Action mailed Dec. 6, 2007", 16 pgs.
"U.S. Appl. No. 10/963,766, Response filed Jul. 15, 2008 to Final Office Action mailed May 15, 2008", 15 pgs.
"U.S. Appl. No. 10/963,766, Response filed Dec. 20, 2008 to Non Final Office Action mailed Sep. 29, 2008", 14 pgs.
"U.S. Appl. No. 11/105,363, Non Final Office Action mailed Jan. 12, 2009", 12 pgs.
"U.S. Appl. No. 11/105,363, Non-Final Office Action mailed Jan. 12, 2009", 22 pgs.
"U.S. Appl. No. 11/105,363, Preliminary Amendment filed Apr. 14, 2005", 7 pgs.
"U.S. Appl. No. 11/105,363, Preliminary Amendment mailed Apr. 14, 2005", 7 pgs.
"U.S. Appl. No. 12/765,431, Final Office Action mailed Feb. 7, 2012", 9 pgs.
"U.S. Appl. No. 12/765,431, Non Final Office Action mailed Sep. 15, 2011", 10 pgs.
"U.S. Appl. No. 12/765,431, Non Final Office Action mailed Oct. 26, 2012", 10 pgs.
"U.S. Appl. No. 12/765,431, Notice of Allowance mailed Jun. 10, 2013", 15 pgs.
"U.S. Appl. No. 12/765,431, Response filed Jan. 28, 2013 to Non Final Office Action mailed Oct. 26, 2013", 8 pgs.
"U.S. Appl. No. 12/765,431, Response filed May 7, 2012 to Final Office Action mailed Feb. 7, 2012", 8 pgs.
"U.S. Appl. No. 12/765,431, Response filed Dec. 15, 2011 to Non Final Office Action mailed Sep. 15, 2011", 9 pgs.
"U.S. Appl. No. 13/439,385, Final Office Action mailed Aug. 1, 2013", 6 pgs.
"U.S. Appl. No. 13/439,385, Non Final Office Action mailed Apr. 2, 2013", 11 pgs.
"U.S. Appl. No. 13/439,385, Notice of Allowance mailed Sep. 17, 2013", 8 pgs.
"U.S. Appl. No. 13/439,385, Preliminary Amendment filed Aug. 15, 2012", 8 pgs.
"U.S. Appl. No. 13/439,385, Response filed Jul. 15, 2013 to Non Final Office Action mailed Apr. 2, 2013", 10 pgs.
"U.S. Appl. No. 13/439,385, Response filed Sep. 3, 2013 to Final Office Action mailed Aug. 1, 2013", 9 pgs.
"CERT (R) Advisory CA-2001-37 Buffer Overflow in UPnP Service on Microsoft Windows", [Online]. [Archived Dec. 14, 2002]. Retrieved from the Internet: <URL: http://web.archive.org/web/20021214113234/www.cert.org/advisories/CA-2001-37.html>, (Dec. 20, 2001), 4 pgs.
"CERT/CC Advisories: 2001, 1-32", [Online]. [Archived Nov. 7, 2001]. Retrieved from the Internet: <URL:http://web.archive.org/web/20011127012540/http://www.cert.org/advisories>, (Nov. 7, 2001), 41 pgs.
"CERT/CC Advisories: 2001, 30-2004, 2", [Online]. Retrieved from the Internet: <URL: http://www.cert.org/advisories>, (Aug. 9, 2005), 12 pgs.
"NETECT (Netecting Network Security)—Company Profile", [Online]. Retrieved from the internet: <URL: www.netect.com>, (1998), 5 pgs.
"SysUpdate—Patch Management with the Policy Compliance & Enforcement (PC&E) Module", Security Profiling, Inc., White Paper—Version 4.2, [Online]. [Archived Feb. 13, 2004]. Retrieved from the internet: <URL: http://web.archive.org/web/20040213185001/http://www.securityprofiling.com/pdf/sysupdate_wp.pdf>, (Oct. 1, 2003), 37 pgs.
"US-CERT—Technical Cyber Security Alerts", [Online]. Retrieved from the Internet: <URL: http://www.us-cert.gov/cas/techalerts/index.html>, (Aug. 5, 2005), 3 pgs.
Rankin, David, et al., "System and Method for Providing Remediation Management for Assets", U.S. Appl. No. 60/573,056, filed May 21, 2004, 49 pgs.

\* cited by examiner

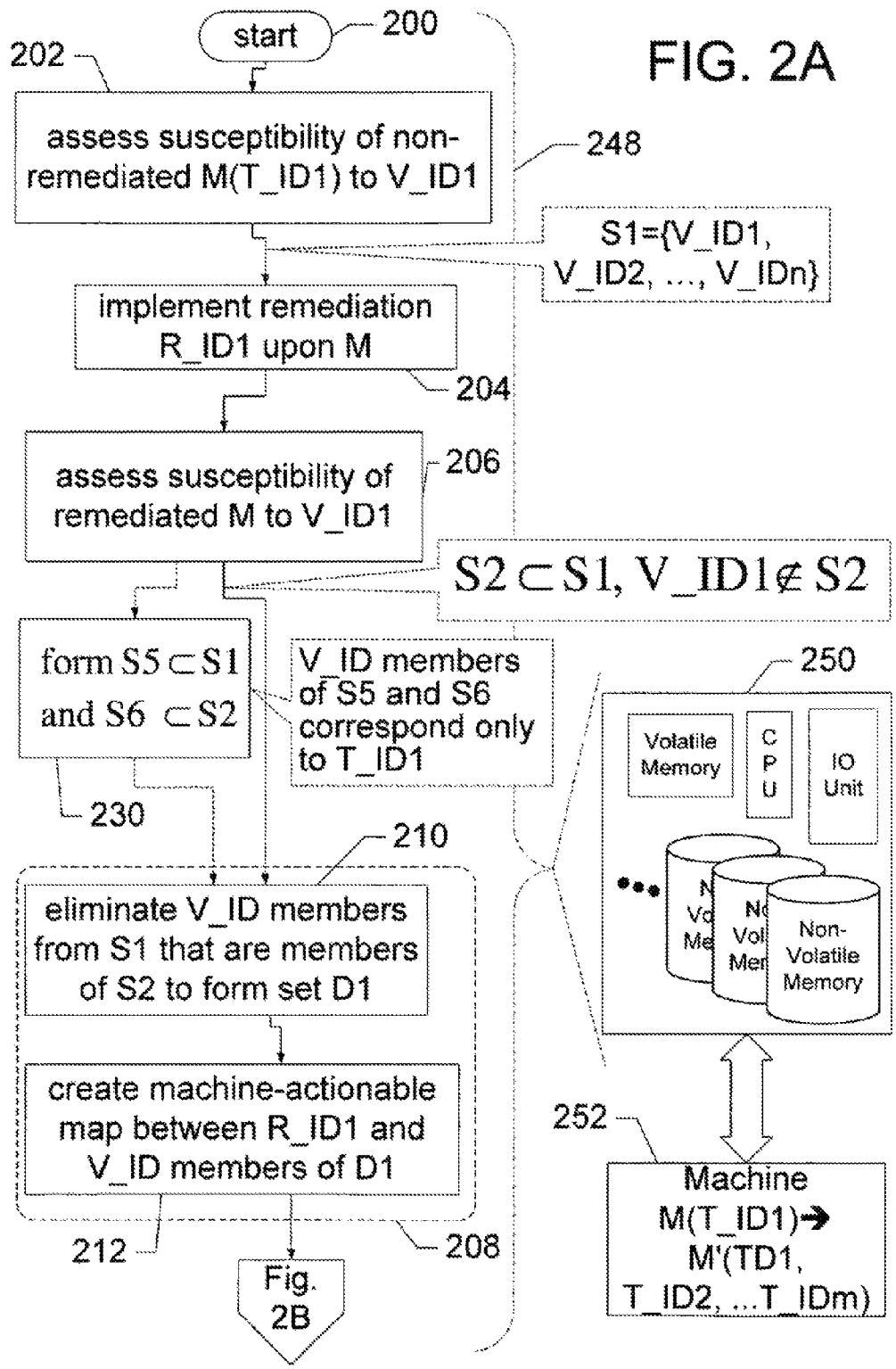

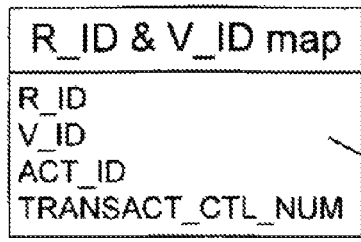
FIG. 6A
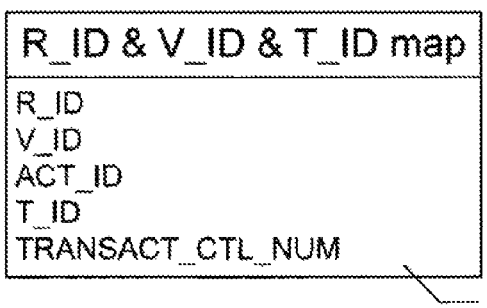
FIG. 6B
FIG. 6C
FIG. 6D

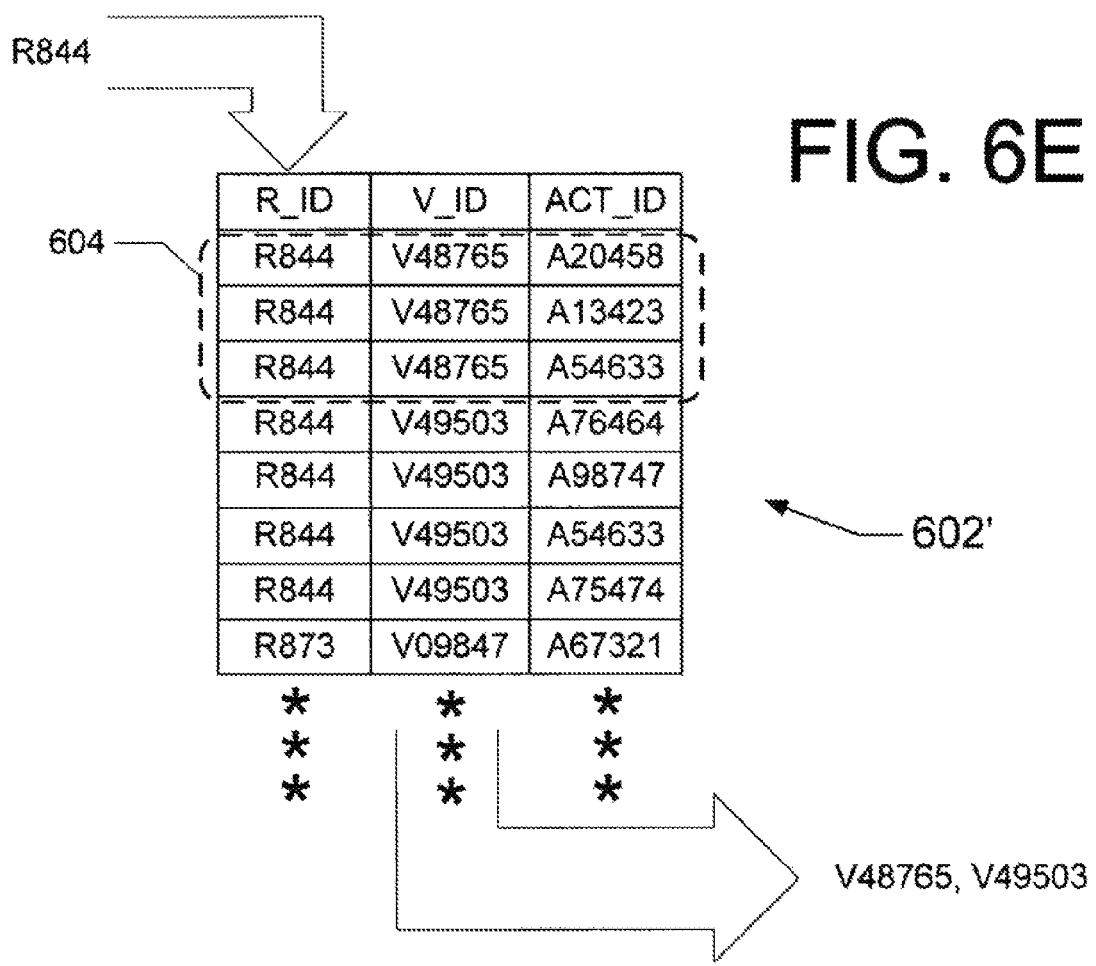

VULNERABILITY-BASED REMEDIATION SELECTION

CONTINUITY AND PRIORITY

This application is a continuation of a copending U.S. patent application having Ser. No. 10/897,402, filed Jul. 23, 2004, the entirety of which is hereby incorporated by reference and for which priority is claimed under 35 U.S.C. §120.

BACKGROUND OF THE PRESENT INVENTION

Attacks on computer infrastructures are a serious problem, one that has grown directly in proportion to the growth of the Internet itself. Most deployed computer systems are vulnerable to attack. The field of remediation addresses such vulnerabilities and should be understood as including the taking of deliberate precautionary measures to improve the reliability, availability, and survivability of computer-based assets and/or infrastructures, particularly with regard to specific known vulnerabilities and threats.

Remediation is based upon knowledge of vulnerabilities. There are many sources of information regarding vulnerabilities, which can be organized into three source categories: non-fee-based open source; non-fee-based computer-vendor; and fee-based vulnerability assessment vendor (VAV). Among the non-fee-based open-sources, the CERT® Coordination Center (hereafter, CERT®), which was the first computer security incident response team (established in November 1988 after a Cornell University graduate student released the "Morris Worm," which brought down much of the Internet and demonstrated the growing network's susceptibility to attack), provides some of the most complete information available about computer system vulnerabilities. For example, an incident report from CERT® about a vulnerability generally includes: a description of it (and typically a list of one or more identifiers associated with it); a characterization of its impact upon a susceptible system; one or more suggested remediations ("solutions" according to CERT® phraseology); and links to other sources of information about it.

SUMMARY OF THE PRESENT INVENTION

At least one embodiment of the present invention provides a machine-actionable memory comprising one or more machine-actionable records arranged according to a data structure. Such a data structure may include links that respectively map between a remediation, at least one action, and at least two vulnerabilities. For example, the links of the data structure respectively can map between: a R_ID field, the contents of which denote an identification (ID) of a remediation (R_ID); at least one ACT_ID field, the contents of which denotes an ID of an action (ACT_ID); and at least two V_ID fields, the contents of which denote IDs of vulnerabilities (V_IDs).

At least one other embodiment of the present invention provides a method of selecting a remediation that is appropriate to a vulnerability which is present on a machine to be remediated. Such a method may include: providing a machine-actionable memory as mentioned above; and indexing into the memory using a given vulnerability identifier to determine (A) at least one of a remediation mapped thereto and (B) at least one action mapped to the given vulnerability identifier.

At least one other embodiment of the present invention provides a method of selecting a remediation that is appropriate to a vulnerability which is present on a machine to be remediated. Such a method may include: providing a machine-actionable memory as mentioned above; and indexing into the memory using a given remediation to determine at least two vulnerabilities mapped thereto.

At least two other embodiments of the present invention provide machines configured to implement the methods mentioned above, respectively.

At least two other embodiments of the present invention provide a machine-readable medium comprising instructions, execution of which by a machine selects a remediation that is appropriate to a vulnerability which is present on a machine to be remediated, as in the selection methods mentioned above, respectively.

Additional features and advantages of the present invention will be more fully apparent from the following detailed description of example embodiments, the accompanying drawings and the associated claims.

BRIEF DESCRIPTION OF THE DRAWINGS

The drawings are: intended to depict example embodiments of the present invention and should not be interpreted to limit the scope thereof. In particular, relative sizes of the components of a figure may be reduced or exaggerated for clarity. In other words, the figures are not drawn to scale.

FIGS. 2A-2B are flowcharts that depict such a mechanism that facilitates translation of the plethora of suggested remediations and their related information into a machine-actionable format in the form of a method of mapping a remediation to a plurality of vulnerabilities, according to at least one embodiment of the present invention.

6A as a table 602', again illustrating data relationships in a machine-actionable memory that represent mappings between R_IDs, V_IDs and ACT_IDs, according to at least one embodiment of the present invention.

FIG. 6C depicts an alternative of the database structure of FIG. 6A, namely a database structure illustrating data relationships in a machine-actionable memory that represent mappings between R_IDs, V_IDs, ACT_IDs and T_IDs, according to at least one embodiment of the present invention.

FIG. 6D depicts an alternative of the database structure of FIG. 6A, namely a database structure illustrating data relationships in a machine-actionable memory that represent mappings between R_IDs, V_IDs, ACT_IDs and CE_IDs, according to at least one embodiment of the present invention.

FIG. 6E is a quasi-flow diagram that depicts a specific type of indexing into the table of FIG. 6B, 602', according to at least one embodiment of the present invention.

Figure 6F:
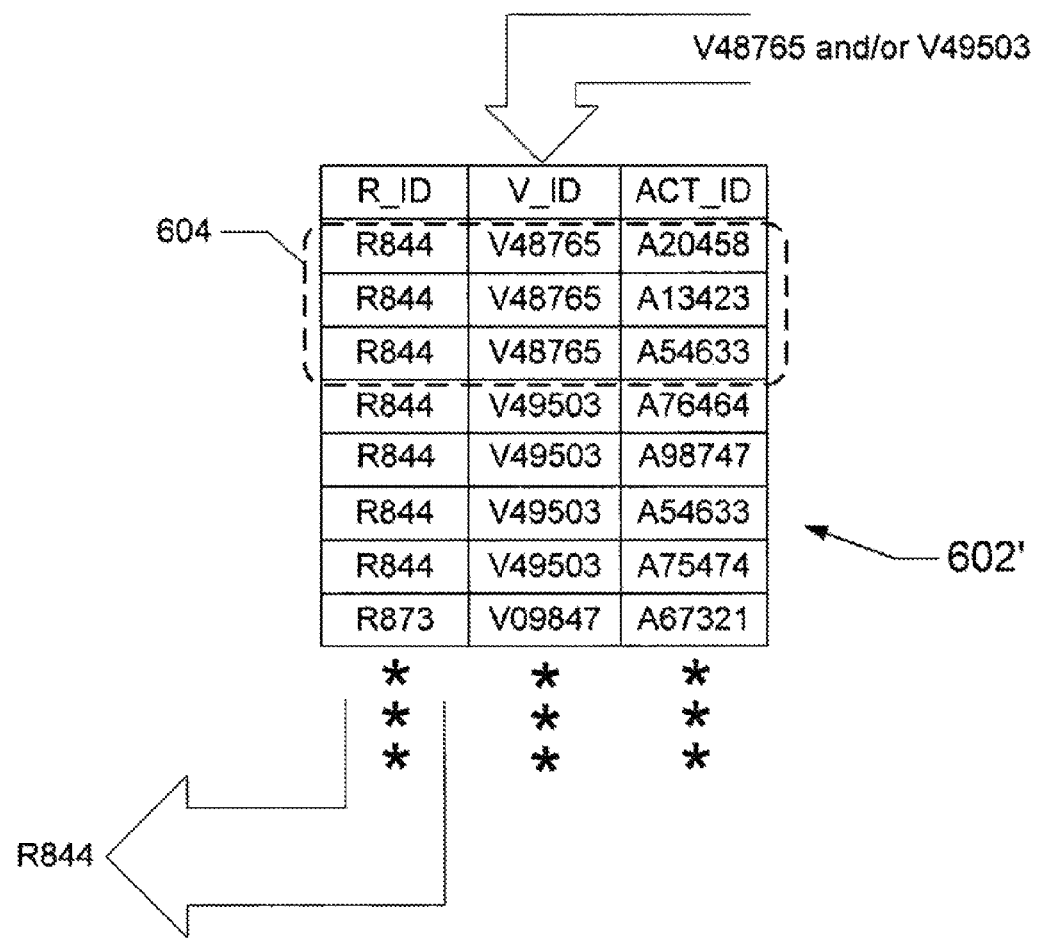
FIG. 6A depicts a database structure illustrating data relationships in a machine-actionable memory that represent mappings between R_IDs, V_IDs and ACT_IDs, according to at least one embodiment of the present invention.
FIG. 6B is an alternative depiction of the database structure of FIG.

FIG. 6F is a quasi-flow diagram that depicts another specific type of indexing into table 602', according to at least one embodiment of the present invention.

It is noted that the following discussion does not address FIGS. 1-6F in numerical order. Rather, the Figures are substantively addressed in the following order: 1; 3; 4; 2A; 6A; 6B; 6C; 6D; 2B; 6E; 6F; and 5.

DETAILED DESCRIPTION OF EXAMPLE EMBODIMENTS

In developing the present invention, the following problems with the Background Art were recognized and a path to a solution identified. There are at least two problems associated with the vulnerability information currently available from the Background Art sources, e.g., from CERTFirst, none of the suggested remediations is provided in an substantially machine-actionable, much less an automatically-machine-actionable format. Rather, the suggested remediation is presented in prose that requires substantial involvement of a human participant in order to implement. Second, the suggested remediations typically do not address the nuances of their implementations across significantly different technologies (e.g., UNIX in the context of an Intel® architecture versus a Motorola® architecture), much less closely related technologies (e.g., Windows® 32 bit vs. 64 bit architectures in the context of an Intel® architecture, or Windows® 2000 vs. Windows® 98 vs. Windows NT®, etc.). A mechanism (here, the computer-context of mechanism is being used, which derives from the machine metaphor used in sciences concerned with man) which can facilitate translation of the plethora of suggested remediations and their related information into a machine-actionable format would help the consolidation and accessibility of such information. Also, a mechanism which can facilitate differentiation of related remediations according to technology would improve the practicality of the suggested remediations. Respective embodiments of the present invention provide such mechanisms.

Figure 1:
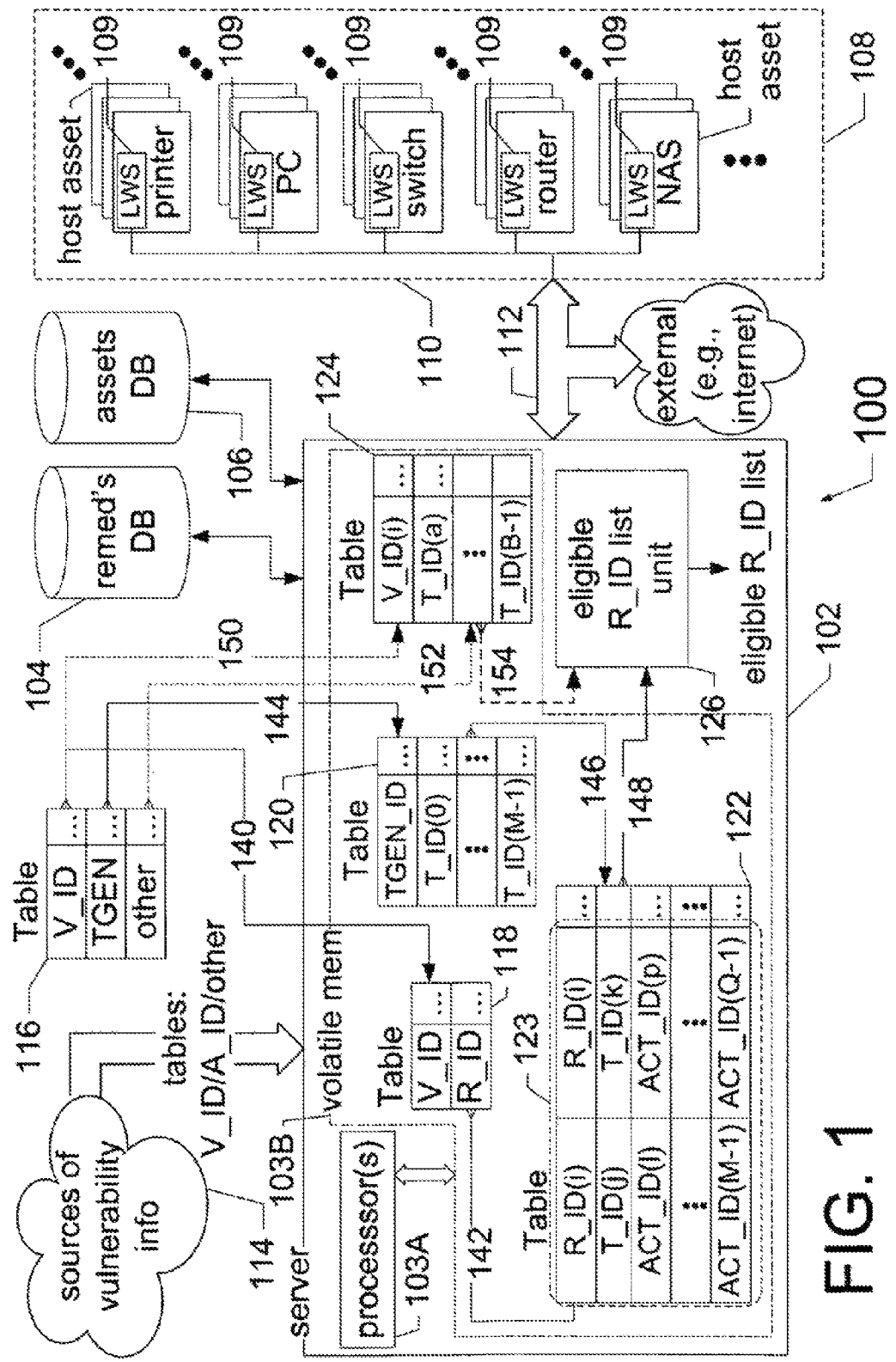
FIG. 1 is a block diagram of an architecture 100 for a remediation system into which embodiments of the present invention can be incorporated, making system 100 itself represent at least one embodiment of the present invention.

FIG. 1 is a block diagram of an architecture 100 for a remediation system into which embodiments of the present invention can be incorporated, making system 100 itself represent at least one embodiment of the present invention.

Architecture 100 includes: a server 102 (having one or more processors 103A and a volatile memory 103B); a database (DB) of remediations 104; a DB of assets 106; a group 108 of networked assets, where generalized networked communication is represented by path 112; and various known sources of vulnerability information 114. Examples of assets in group 108 include printers, computers (also referred to as PCs), switches, routers, network-attached storage (NAS) devices, etc. Group 108 can be generalized as including devices having some measure of program-code-based operation, e.g., software, firmware, etc., which can be manipulated in some way via an instance of a communication, e.g., arriving via path 12, and as such can be vulnerable to attack.

Server 102 can be a component of the network to which group 108 represents assets. DBs 106 and 108 can be local non-volatile memory resources of server 102. Remediation DB 106 can be a local copy of a corresponding remediation DB created, maintained and/or updated by a remote remediation service provider.

Each of the various networked assets in group 108 is depicted as including a light weight sensor (LWS) 109. Each LWS 109 and server 102 adopt a client-server relationship. Operation of each LWS 109 can include gleaning information about its host-asset and sending such information to server 102; and receiving remediations in an automatically-machine-actionable format from server 102 and automatically implementing the remediations upon its host-asset.

Such an automatically-machine-actionable remediation can take the form of a sequence of one or more operations that automatically can be carried out by the host asset. Such operations can be invoked by one or more machine-language commands, e.g., one or more Java byte codes.

Server 102 prepares and sends remediations to the various assets of group 108 based upon vulnerability information received from sources 114 thereof, remediation database 104 and asset database 106. At an intermediate stage in the preparation, an eligible remediation identification (R_ID) list unit 126 in server 102 produces a list of eligible R_IDs. Unit 126 can be a part of the one or more processors 103A, e.g., a service running thereon.

Tables 118, 120, 122 and 124 are depicted in server 102 to represent how server 102 uses information in DBs 104 and 106 to generate the inputs to unit 126. Tables 118-124 can represent copies, that are kept in volatile memory (not depicted) of server 102, of some or all of the data in DBs 104 and 106. Or, tables 118-124 can merely be a symbolic depiction of a database query to DBs 104 and 106, respectively.

The vulnerability information from sources 114 can be in the form of tables 116 or easily tabulated into tables 116. Regardless, tables 116 generally do not contain much in the way of machine-actionable data. Each table 116 describes a given vulnerability and will typically include at least: a field for a vulnerability identification number (V_ID), a field for a prose technology genus (TGEN); and a field for a prose description of the vulnerability. By analyzing tables 116, each of table 118 and table 120 can be developed, as will be discussed below.

Table 118 maps V_IDs used by sources 114 to corresponding remediation identification numbers (R_IDs) according to some common aspect of vulnerability, respectively. In table 118, many remediations can map to one vulnerability, and many vulnerabilities can map to one remediation. Table 118 can be indexed using a given V_ID, e.g., V_ID1, to obtain the corresponding R_ID, e.g., R_ID1, as reflected by paths 140 and 142 in FIG. 1.

Table 120 maps TGEN identification numbers (TGEN_IDs) to identification numbers of technology species thereof (T_IDs). The relationships in table 120 can be analogized to the more familiar tree hierarchy.

Figure 3:
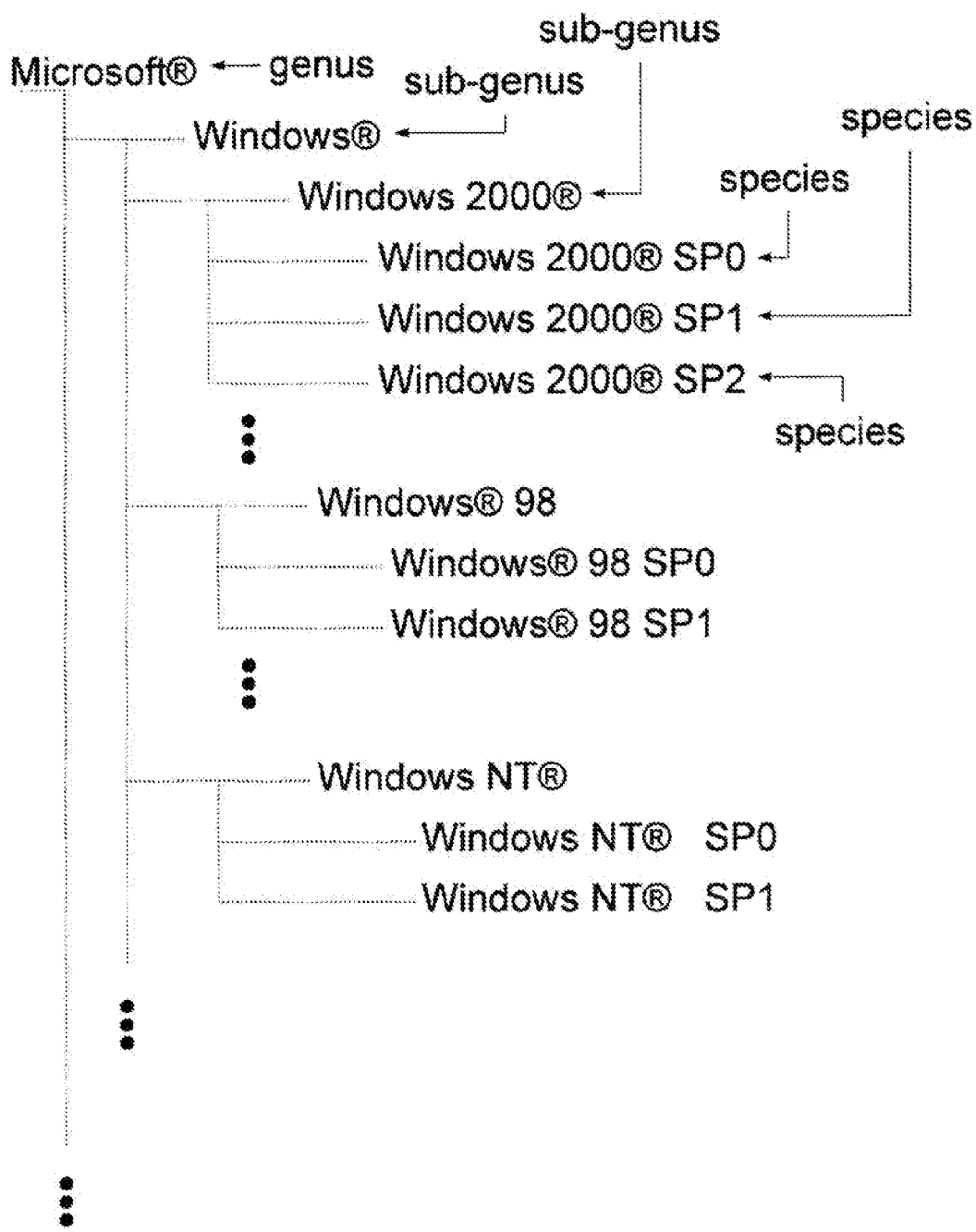
FIG. 3 is a tree-hierarchy diagram illustrating genus/subgenus/ . . . /species relationships in which the species would be assigned T_IDs, according to at least one embodiment of the present invention.

FIG. 3 is a tree-hierarchy diagram illustrating genus/sub-genus/.../species relationships in which the species would be assigned T_IDs, according to at least one embodiment of the present invention.

More particularly, FIG. 3 assumes an example of the Microsoft® Corporation and its Windows® family of operating systems. In FIG. 3, Microsoft® is the genus, Windows® is a sub-genus, Windows® 2000 is a sub-genus reporting to Windows®, Windows® 2000 SP0 is a first species, Windows® 2000 SP1 is a second species, Windows® 2000 SP2 is a second species, etc.

Again, table 120 represents a mapping of genus/sub-genus/ . . . /species relationships that can be found in a tree-hierarchy diagram. Upon determining the TGEN_ID for the TGEN of table 116, table 120 can be indexed (see path 144) using the TGEN_ID to obtain (see path 146) the corresponding one or more T_IDs, T_ID(0), . . . ,T_ID(M−1).

Table 122 is a table of remediations that can be obtained via use of the mechanism (mentioned above and discussed further below) that facilitates translation of the plethora of suggested remediations and their related information into a machine-actionable format, and via use of the mechanism (mentioned above and discussed further below) that facilitates differentiation of related remediations according to technology. For a given remediation R_ID, table 122 provides one or more action identification numbers (ACT_IDs) corresponding to actions that, in combination, can mitigate a corresponding vulnerability. Depending upon the technology T_ID, the group of one or more action ACT_IDs for a remediation R_ID might differ. In table 122, dashed rectangle 123 encompasses a group of ACT_IDs, namely ACT_ID(1), . . . , ACT_ID(M−1), that correspond to technology T_ID(j) for a given vulnerability.

Table 122 can be constructed, e.g., by analyzing, coordinating and distilling the information in tables 116 (obtained, again, from sources 114). In particular, one performing such analyzing, coordinating and distilling should be alert to recognizing any aspects of relatedness for two or more of tables 116 so that such relatedness can be translated into relational links that include: links between V_IDs & R_IDs; and R_IDs, T_IDs and groups of ACT_IDs whose correspondence to the R_IDs exhibits variation in dependence upon the T_IDs, respectively.

Table 122 can be indexed with the R_ID output of table 118 (see path 142) and the one or more T_IDs output from table 120 (see path 146) in order to obtain a collection of R_IDs that might mitigate the vulnerability V_ID of table 116. This collection of R_IDs is provided to unit 126, which filters the collection to obtain a list of R_IDs that are eligible for deployment to LWSs 109 that are deployed on the assets of group 108.

It should be understood that table 122 in FIG. 1 includes one or more machine-actionable records (a type of map implementation) 123 arranged according to a data structure, where the data structure includes links that respectively map between: a R_ID field, the contents of which denote an identification (ID) of a remediation (R_ID); at least one T_ID field, the contents of which denotes an ID of at least two technologies (T_IDs), respectively; and a at least one ACT_ID field, the contents of which denote IDs of actions (ACT_IDs), respectively.

More particularly, at least one of the data structures in table 122 further includes: a plurality of ACT_ID fields, the contents of which denote a plurality of ACT_IDs, respectively; at least one SS link relating the plurality of ACT_ID fields; at least one T-SS link between the at-least-one T_ID field and the at-least-one subset, respectively; and at least on R-SS link between the R_ID field and the at-least-one subset.

Typically, but not necessarily, the data structure for records in table 122 would include at least two of the T_ID fields, the contents of which denote least two T_IDs, respectively. Similarly typically, but not necessarily, the data structure for records in table 122 would include: two or more of the SS links, the two-or-more SS links relating one or more of the plurality of ACT_ID fields as subsets, respectively, of the plurality of ACT_ID fields; at least two of the T-SS links, the at-least two T-SS links being between the at-least-two T_ID fields and the two-or-more subsets, respectively; and at least two of the R-SS links, the at-least-two R-SS links being between the R_ID field and the two-or-more subsets, respectively.

Table 122 optionally can be expanded to include a field, the contents of which denote a value that is indicative of a degree to which implementing the remediation on a machine is invasive thereof (hereafter, an invasiveness value). The invasiveness-value corresponding to the invasiveness field can represent a point on a continuum of invasiveness which, e.g., classifies patching an operating system as being a more invasive type of remediation and classifies editing a file as being a less invasive type of remediation. Such a continuum of invasiveness could also classify editing a registry value as being a moderately invasive type of remediation.

Occasionally, an instance of table 116 is sufficiently detailed such that one or more T_IDs can be identified and a mapping (as indicated by paths 150 and 152) made therebetween. Table 124 represents the result of such a mapping. Table 124 can be indexed using a given V_ID to obtain a list of one or more corresponding T_IDs, if such a list exists. Then the list is provided to unit 126.

Figure 4:
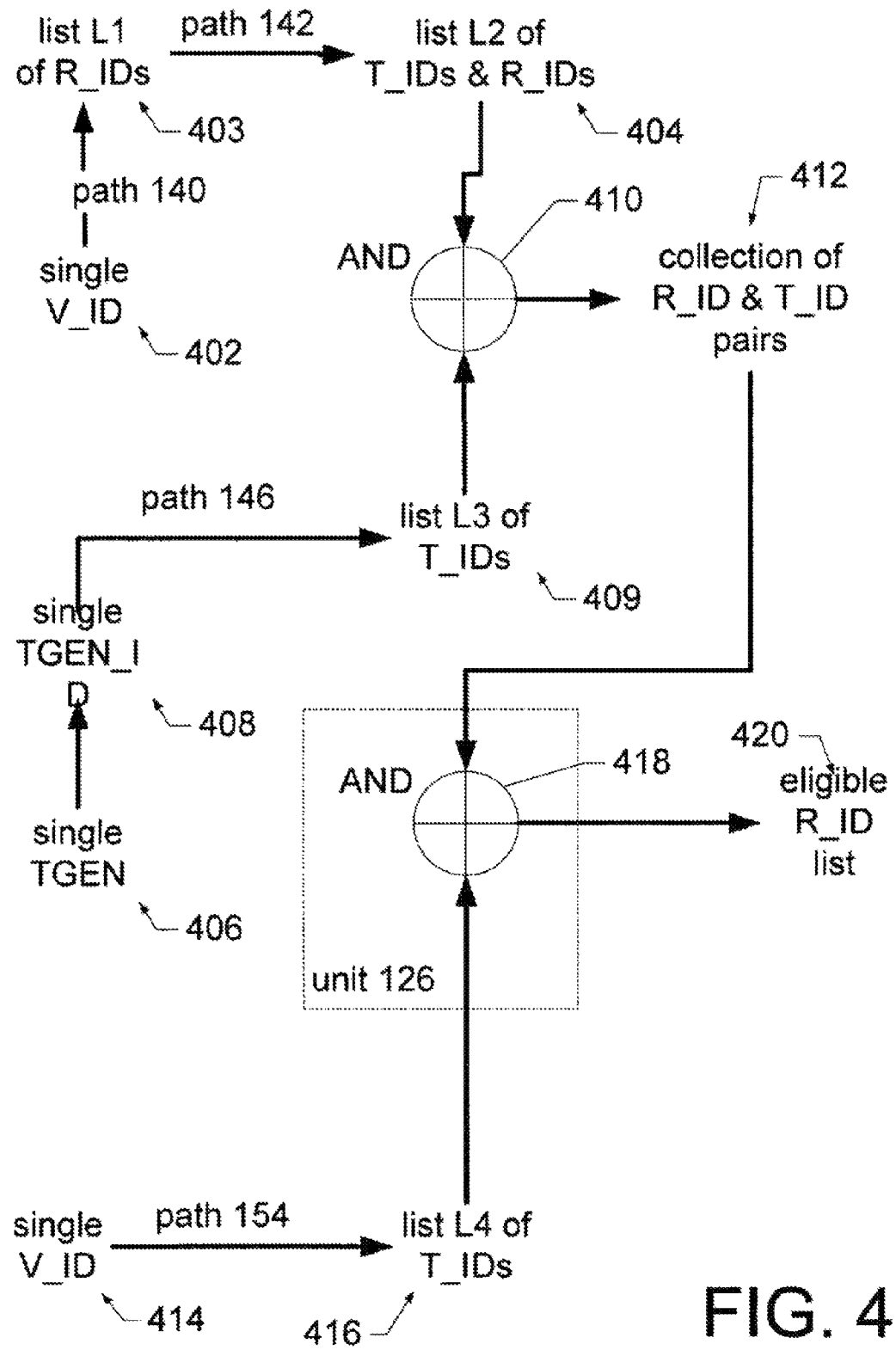
FIG. 4 is a flow diagram illustrating a method for obtaining an eligible R_ID list can be obtained, according to at least one embodiment of the present invention.

FIG. 4 is a flow diagram illustrating a method for obtaining an eligible R_ID list can be obtained, according to at least one embodiment of the present invention. The flow diagram of FIG. 4 can be implemented, e.g., by server 102.

At reference No. 402, a single V_ID is obtained from, e.g., an instance of a table 116. Table 118 is then indexed (see path 140) using the single V_ID to obtain a list L1 of R_IDs at reference No. 403. If this is the first instance of encountering the V_ID, then it is determined whether an aspect of the vulnerability is common to any other V_IDs. If not, then this is a circumstance in which a new remediation arises for which a new R_ID is assigned to the vulnerability. But if there is an aspect to the current vulnerability that is common to at least one other V_ID, then the current V_ID is assigned to the R_ID associated with the common aspect of vulnerability. List L1 (obtained at 403) is then used to index (see path 142) into table 122 to obtain a list L2 of T_IDs & R_IDs at reference No. 404.

At reference No. 406, a single TGEN (again, prose technology genus) is obtained from, e.g., the same instance of table 116. At reference No. 408, the TGEN_ID (again, TGEN identification number) corresponding to the TGEN of 406 is obtained. Typically, the TGEN will have been encountered before such that the corresponding TGEN_ID will already exist. But if not, then a new TGEN_ID is generated.

The TGEN_ID of 408 is used to index (see path 144) into table 120 to obtain a list L3 of T_IDs at reference No. 409. As indicated by symbol 410 (representing a logical AND operation), lists L2 and L3 are ANDed together, e.g., in the context of a database operation. Assuming that sets of parameters are associated with records, respectively, then a database type of AND operation is typically performed upon a subset of the parameters, and all parameter members of the sets associated with the records indicated by the AND operation are retained, not just the parameters upon which the AND operation is conducted.

The result obtained at AND 410 is a reduced collection of R_ID & T_ID pairs at reference No. 412. Meanwhile, at reference No. 414, the same single V_ID is indexed (see path 150) into table 124 to obtain at reference No. 416 a list L4 (if available) of T_IDs corresponding to the single V_ID. As indicated by logical AND symbol 418, the collection and list L4 are ANDed together (e.g., in the database sense of an AND operation) to obtain an eligible R_ID list at reference No. 420.

Each R_ID indicated as eligible by its presence on the list can be differentiated according to T_ID so as to yield, potentially, different groups of ACT_IDs for different T_IDs even though the R_ID is the same. This can be described as variations of the R_ID. As such, each R_ID on the eligible-list exhibits or carries forward the robustness of the mapping represented by table 122.

Alternative patterns of flow in FIG. 4 are possible. It is noted that list L2 is used to reduce (typically, but not necessarily) the number of T_IDs on list L2, and then subsequently list L4 is used to reduce (typically, but not necessarily) the number of T_IDs in the collection. As an example of an alternative, list L4 could be used at first to reduce (typically, but not necessarily) list L2, and then subsequently list L3 could be used for further reduction (which is typically, but not necessarily expected to result). Other alternatives are possible.

In other words, FIG. 4 is a flow diagram of a method (according to at least one embodiment of the present invention) for selecting a remediation that is appropriate to a technology present on a machine to be remediated. Such a method includes: providing a machine-actionable memory that includes one or more machine-actionable records like, e.g., table 122; and indexing into the memory using a given R_ID value and a given T_ID value to determine values of one or more ACT_IDs corresponding to the given R_ID value and appropriate to the given T_ID value. The given R_ID value can be obtained upon receiving a V_ID and determining, e.g., via using table 118, a R_ID associated/mapped-to the V_ID.

Figure 2B:
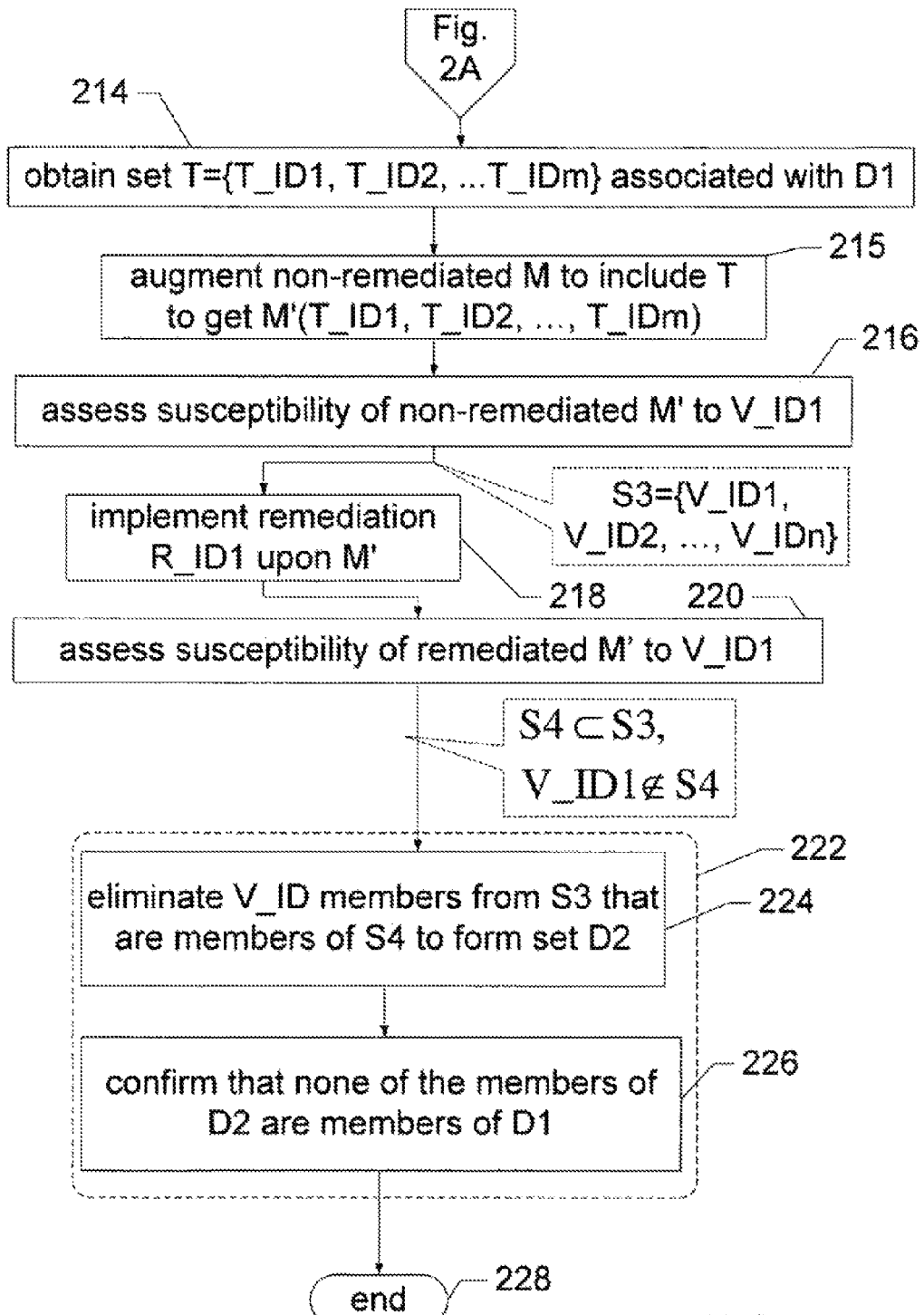

FIGS. 2A-2B are flowcharts that depict such a mechanism (namely, that facilitates translation of the plethora of suggested remediations and their related information) into a machine-actionable format in the form of a method of mapping a remediation to a plurality of vulnerabilities, according to at least one embodiment of the present invention. In developing the present invention, it was recognized that a remediation that works for a first vulnerability typically works for multiple vulnerabilities. This is contrary to the thinking of the Background Art, which presumes a 1:1 relationship between a vulnerability and a remediation.

In FIG. 2A, flow begins at block 200 and goes to block 202, where the susceptibility of a machine, M, to a given vulnerability having V_ID1 is assessed. It is assumed that a remediation having remediation identification (R_ID) 1 (R_ID1) has been identified for V_ID1.

Because information concerning a vulnerability that is provided according to the Background Art typically does not address the nuances of implementing a suggested remediation across different technologies, it was recognized (during development of the present invention) that it is prudent to confirm that a specific technology is susceptible to a particular vulnerability. For example, assume a vulnerability is described for the Windows® operating system. Let's refer to the Windows® operating system as a technology genus. A prudent approach tests a machine (a test-subject) configured to each of the technology species of the genus (and any sub-species) because species susceptibility is not necessarily true where genus susceptibility is initially indicated. Continuing the example, some species technologies that should be tested for susceptibility to vulnerability V_ID1 include: Windows® 2000 service pack zero (SP0); Windows® 2000 SP1; Windows® 2000 SP2, etc.; Windows® 98 SP0; Windows® 98 SP1; etc.; Windows NT® SP0; Windows NT® SP1; etc.

In FIG. 2A, the test-subject is depicted as a machine M (252) that has been configured initially to a particular technology TD1, and is bidirectionally coupled to a tester-host 250. Tester-host 250 can be a typical computer (also referred to as a PC). Typical hardware components for tester-host 250 include a CPU/controller, an I/O unit, volatile memory such as RAM and non-volatile memory media such disk drives and/or tape drives, ROM, flash memory, etc.

Susceptibility testing can correspond to some of the aspects of a method represented by blocks 200-230 of FIGS. 2A-2B, which can be implemented via software that runs on tester-host 250. This relationship between blocks 200-230 and tester-host 250 is depicted by a bracket 248 in FIG. 2A that calls out blocks 200-212. For simplicity of depiction, neither a corresponding bracket nor tester-host 250 has been depicted in FIG. 2B.

In block 202, it is assumed that non-remediated machine M (252) has been configured to include at least technology T_ID1. Tester-host 250 scans non-remediated machine M (252) to assess its susceptibility to vulnerability V_ID1 using known vulnerability scanning software. In most instances where susceptibility to vulnerability V_ID1 is confirmed, one or more additional vulnerabilities (e.g., V_ID2, ..., V_IDn) of machine M (252) are identified. The result of the scan can be organized as a first set, S1, of vulnerabilities.

$$S1=\{V\_ID1, V\_ID2, \ldots, V\_IDn\} \quad (1)$$

Flow proceeds to block 204, where tester-host 250 implements remediation R_ID1 upon machine M (252). Next, at block 206, tester-host 250 scans remediated machine M (252) to assess its susceptibility to vulnerability V_ID1. Typically, the remediation will mitigate (reduce or eliminate) the susceptibility. The testing of block 206, in effect, confirms the efficacy of the remediation if V_ID1 is no longer present in the output of the scan. As before, the scan output is organized as a second set, S2, of vulnerabilities that, typically, is a subset of the first set. S2 could, but will not necessarily, be empty.

$$S2 \subset S1, \text{ where } V\_ID1 \notin S2 \quad (2)$$

Flow proceeds to block 208, where tester-host 250 creates a mapping between R_ID1 and two or more V_ID members of S1 based upon differences between S1 and S2. This mapping is reflected in table 118 of FIG. 1. In more detail, block 208 can include blocks 210 and 212. Flow can proceed from block 206 to block 210, where tester-host 250 (or another computer having access to S1 and S2) eliminates V_ID members of S1 that are also members of S2. This forms a remainder set D1.

$$D1 \subset S1, \text{ where } V\_ID1 \notin D1 \text{ but } \notin S2 \quad (3)$$

At block 212, tester-host 250 (or another computer having access to S1 and S2) can create the mapping to be between R_ID1 and the V_ID members of set D 1.

FIG. 6A depicts a database structure 602 illustrating data relationships in a machine-actionable memory that represent mappings between R_IDs, V_IDs and ACT_IDs, according to at least one embodiment of the present invention. As such, database structure 602 illustrates a particular type of machine-actionable memory arranged according to a particular data structure.

More particularly, FIG. 6A can represent, at least in part, the mapping between R_ID1 and the V_ID members of set D1. Unlike the depictions (e.g., in FIG. 1) of the various tables mentioned above, database structure 602 is depicted as a UML-type database structure. This should be understood to mean that database structure 602 represents an at least M×N array, e.g., M rows and N columns where M and N are integers. The N labels in box 603 denote the columns (not depicted) in the array denoted by database structure 602, where there is a column for each label. A row (not depicted) of the array denoted by database structure 602 corresponds to a combination of values of the respective columns called out by box 603.

Box 603 indicates that database structure 202 can include, e.g., the following columns: R_ID; V_ID; ACT_ID; and TRANSACT_CTL_NUM (a surrogate key to uniqueness of rows in database structure 602). FIG. 6B (to be discussed below) presents an alternative depiction of database structure 602.

According to the thinking in the Background Art, only one remediation is associated with one vulnerability. As such, the V_ID members of S1 other than V_ID1 are of no concern to the Background Art. To use an analogy, the Background Art would view the V_ID members of S1 other than V_ID1 as the chaff from which a kernel of wheat (V_ID1) is to be separated. The Background Art would fail to recognize that (typically) there are one or more other kernels of wheat in the chaff. The flowchart of FIG. 2A illustrates a method of gleaning the chaff to obtain the extra wheat. Those extra kernels of wheat are the V_ID members of set D1 other than V_ID1. The other members of set D1 correspond to other vulnerabilities that remediation R_ID1 can mitigate. An advantage to the mapping of block 212 is that it can substantially increase the arsenal of remediations available and/or significantly reduce the number of remediations needed to mitigate a collection of vulnerabilities.

FIG. 6B depicts a table 602' illustrating data relationships in a machine-actionable memory that represent mappings between R_IDs, V_IDs and ACT_IDs, according to at least one embodiment of the present invention. As such, table 602' illustrates a particular type of machine-actionable memory arranged according to a particular data structure.

Table 602' is a version of database structure 602, albeit depicted as a table instead of a UML-type database structure. Further, for purposes of illustration, table 602' has been populated with fictitious representations of values for the respective column entries. Review of table 602' reveals, among other things, the following: dashed block 604 concerns R_ID=R844, which is mapped to V_ID=V48765, and which (for a given T_ID) can be implemented by three ACT_IDs (namely A20458, A13423 and A54633), hence block 604 encloses three rows; and RID=R844 maps to at least two V_IDs, namely, V_ID=V48765 and V_ID=V49503.

As an alternative, the database structure 602 can be modified to extend the mapping to include T_IDs. FIG. 6C depicts such an alternative, namely database structure 606 illustrating data relationships in a machine-actionable memory that represent mappings between R_IDs, V_IDs, ACT_IDs and T_IDs, according to at least one embodiment of the present invention. As such, database structure 606 illustrates a particular type of machine-actionable memory arranged according to a particular data structure. Box 608 includes the labels of box 603, plus the label T_ID.

As another alternative, the database structure 602 can be modified to extend the mapping to include asset identifications, e.g., CE_IDs. The term CE_ID is an acronym for an identification (ID) of a given LWS 109 loaded on a given host-asset, and where each instance of a host-asset 16X can be described as a client environment (CE). FIG. 6D depicts such an alternative, namely database structure 610 illustrating data relationships in a machine-actionable memory that represent mappings between R_IDs, V_IDs, ACT_IDs and CE_IDs, according to at least one embodiment of the present invention. As such, database structure 610 illustrates a particular type of machine-actionable memory arranged according to a particular data structure. Box 612 includes the labels of box 603, plus the label CE_ID, and optionally (as indicated by the dashed box therearound) the label T_ID. Of course, other alternative versions of database structure 602 are contemplated.

Discussion now turns to FIG. 2B, which is a continuation of FIG. 2A.

FIG. 2B extends the method of FIG. 2A to include testing that confirms the efficacy of R_ID1 for the V_ID members of set D1. Flow can proceed from block 208/212 of FIG. 2A to block 214 of FIG. 2B, where tester-host 250 (or another computer having access to S1 and S2) determines what additional technologies beyond T_ID1 are associated with the member V_IDs of D1 in order to form a set, T.

$$T1=\{T\_ID1, T\_ID2, \ldots, T\_IDm\} \quad (4)$$

At block 215, tester-host 250 augments non-remediated machine M (252) to add technologies T_ID2, . . . , T_IDm of set T, resulting in a second version M' of machine M (252). At block 216, tester-host 250 scans non-remediated machine M' (252) to assess its susceptibility to vulnerability V_ID1. As before, this should yield a third set S3 that is the same as or similar to S1.

$$S3=\{V\_ID1, V\_ID2, \ldots, V\_IDn\} \quad (5)$$

Flow proceeds to block 218, where tester-host 250 implements remediation R_ID1 upon machine M' (252). Next, at block 220, tester-host 250 scans remediated machine M' (252) to assess its susceptibility to vulnerability V_ID1. Typically, the remediation will mitigate the susceptibility to all of the vulnerabilities of residual set D1. The testing of block 220, in effect, confirms the efficacy of the remediation if all of the member V_IDs of set D1 are no longer present in the output of the scan. As before, the scan output, typically, is a subset S4 of the third set S3. S4 could, but will not necessarily, be empty.

$$S4 \subset S3, \text{ where } V\_ID1 \notin S4 \quad (6)$$

Flow proceeds to block 222, where tester-host 250 verifies that remediation R_ID mitigates all of the V_ID members of set D1. More particularly, block 222 can include blocks 224 and 226. Flow can proceed from block 220 to block 224, where tester-hoster 250 (or another computer having access to S1 and S2) eliminates V_ID members of set S3 that are also members of set S4. This forms a remainder set D2.

$$D2 \subset S3, \text{ where } V\_IDi \notin D2 \text{ but } \notin S4 \quad (7)$$

At block 226, tester-host 250 confirms that none of the V_ID members of set D2 are present in set D1, e.g., by verifying that the intersection of sets D1 and D2 is empty.

$$D1 \cap D2 = \emptyset \quad (8)$$

After block 222/226, flow ends at block 228.

In FIG. 2A, sets S1 and S2 can include vulnerabilities that correspond to technologies other than T_ID1. Where it is desired to determine if remediation R_ID1 mitigates vulnerabilities other than V_ID1 only for T_ID1 (or some subset of set T), then flow can pass through optional block 230 after leaving block 206 and before arriving at block 208/210. At block 230, tester-hoster 250 (or another computer having access to S1 and S2) can form fifth and six sets S5 & S6 from sets S1 and S2, respectively, by selecting only V_ID members of sets S5 and S6 that correspond to technology T_ID1 (or the member technologies of some subset of set T).

To summarize, a result of the mechanism of FIGS. 2A-2B can be represented as at least a part of database structure 602. Once database structure 602 is created, it can be indexed using a given R_ID to obtain one, two or more V_IDs remediated thereby. Similarly, once database structure 602 is created, it can be indexed using a given V_ID to obtain a corresponding R_ID. Again, it is likely that two or more given V_IDs will obtain the same R_ID. The former circumstance is depicted in FIG. 6E. The latter circumstance is depicted in FIG. 6F.

FIG. 6E is a quasi-flow diagram that depicts a specific type of indexing into table 602', according to at least one embodiment of the present invention.

Again, table 602' of FIG. 6E is a version of database structure 602 albeit depicted as a table instead of a UML-type database structure. In FIG. 6E, it is assumed that table 602' is indexed via R_ID=R844, which yields/identifies/is-mapped-to two V_IDs, namely V48765 and V49503. Again, for purposes of illustration, table 602' has been populated with fictitious representations of values for the respective column entries.

FIG. 6F is a quasi-flow diagram that depicts another specific type of indexing into table 602', according to at least one embodiment of the present invention.

Again, table 602' of FIG. 6F is a version of database structure 602 albeit depicted as a table instead of a UML-type database structure. In FIG. 6F, it is assumed that table 602' is indexed via V_ID=V48765 and/or V_ID=V49503, both of which yield/identify/are-mapped-to R_ID=R844, which yields two V_IDs, namely and. Again, for purposes of illustration, table 602' has been populated with fictitious representations of values for the respective column entries.

Figure 5:
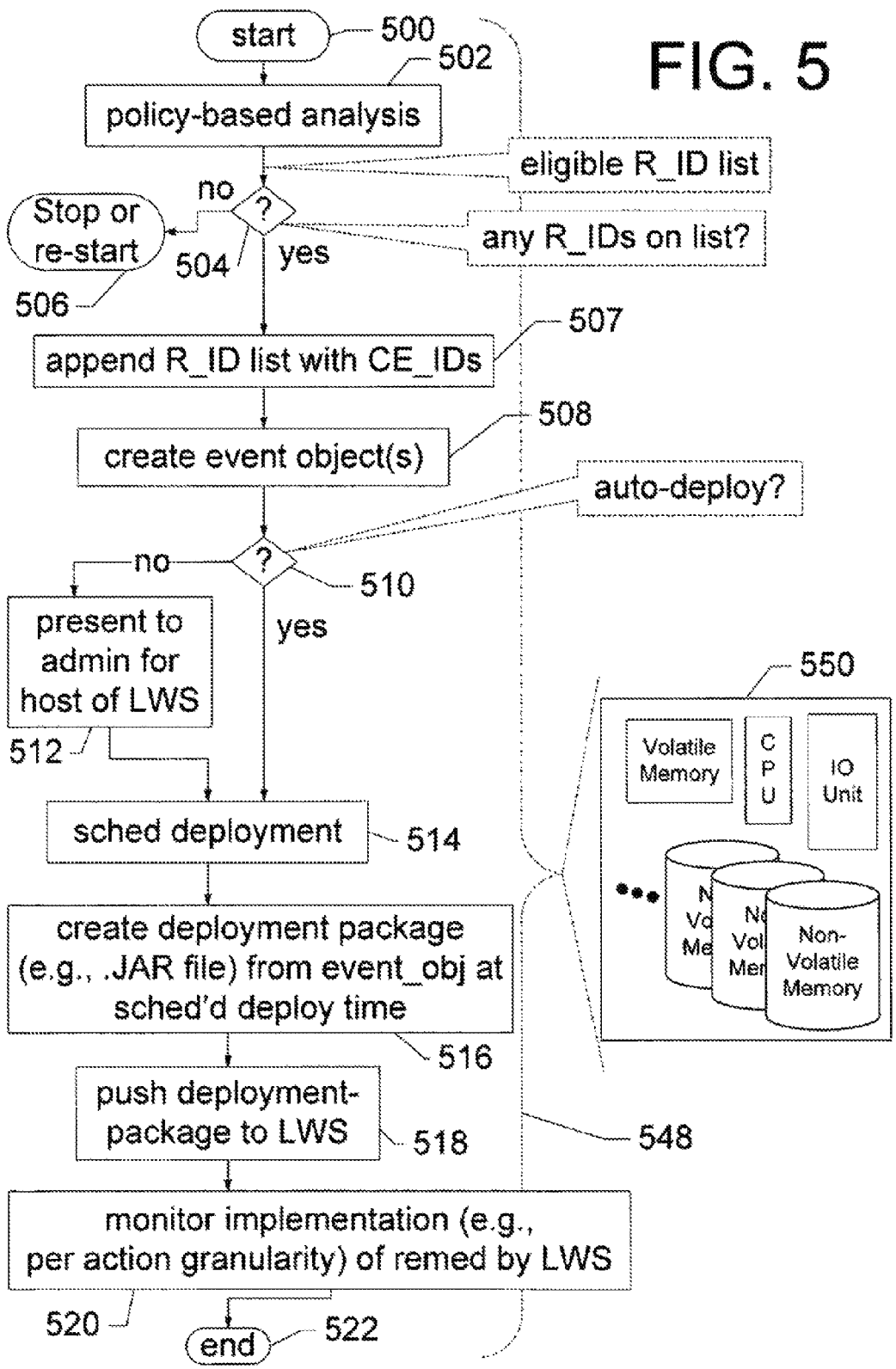
FIG. 5 is a flow diagram illustrating a vulnerability-based method of remediation selection, and a method of remediation deployment, according to at least one embodiment of the present invention.

A context in which to view the above discussion can be provided by referring to FIG. 5.

FIG. 5 is a flow diagram illustrating a vulnerability-based method of remediation selection, and a method of remediation deployment, according to at least one embodiment of the present invention.

Flow in FIG. 5 begins at block 500 and proceeds to block 502, which has the label "vulnerability-based analysis." The preceding discussion has described a vulnerability-based analysis that maps a vulnerability to a remediation, often two or more vulnerabilities to the same remediation. Such a mapping is depicted, e.g., in database structure 602, etc. This can be contrasted with what can be described as a policy-based analysis.

Examples of policy-based analysis are provided in two copending applications that are assigned to the same assignee as the present application. The two related copending applications are: U.S. patent application Ser. No. 10/933,504 having a U.S. filing date of Sep. 3, 2004 and U.S. patent application Ser. No. 10/933,505 having a U.S. filing date of Sep. 3, 2004. The entirety of the '504 patent application is hereby incorporated by reference. The entirety of the '505 patent application is hereby incorporated by reference.

The output of the vulnerability-based analysis in block 502 can be the eligible R_ID list mentioned above. From block 502, flow proceeds in FIG. 5 to decision block 504, where server 102 can check whether there are any R_IDs on the list. Typically, one would expect that the list would contain at least one R_ID. If not, then flow can proceed to block 506 where flow stops or re-starts, e.g., by looping back to block 500. But if there is at least one non-null entry in the list of eligible R_IDs, then flow can proceed to block 507, where server 102 can, e.g., append pertinent CE_IDs to the list of eligible R_IDs. Doing so identifies assets that are targets of the R_IDs on the eligible list. For example, server 102 can index into remediation DB 104 using the R_IDs on the eligible list thereof to get a list of corresponding T_IDs, and then use that T_ID list to index into assets DB 106 to get a list of CE_IDs that have one or more of these T_IDs present. Flow can proceed to block 508 from block 507.

At block 508, server 102 can create an event object (EVENT) corresponding to each non-null entry in the list of eligible R_IDs. Flow can then proceed to decision block 510.

At decision block 510, server 102 can determine whether to automatically deploy each event object. As each is produced, server 102 can then determine whether the object EVENT(i) should be automatically deployed, e.g., based upon an automatic deployment flag set in a record for the R_ID value stored in remediation DB 104. Alternatively, a field labeled AUTO_DEP can be added to each entry in the list of eligible R_IDs, which would be carried forward in each object EVENT(i). The administrator of architecture 100 can make the decision about whether a particular remediation should be automatically deployed.

If automatic-deployment is not approved for the remediation of object EVENT(i), then flow can proceed to block 512 from decision block 510. At block 512, server 102 can present information about object EVENT(i) to, e.g., the administrator of architecture 100, who can then decide whether or not to deploy the remediation. Flow proceeds to block 514 from block 512. But if automatic-deployment is approved for object EVENT(i), then flow can proceed directly to block 514 from decision block 510.

At block 514 of FIG. 5, a point in time at which to deploy object EVENT(i) is determined. Flow proceeds to block 516, where a deployment package D_PAK(i) corresponding to object EVENT(i) is prepared, e.g., as of reaching the time scheduled for deploying object EVENT(i). Deployment package D_PAK(i) can represent the remediation in an automatically-machine-actionable format, e.g., (again) a sequence of one or more operations that automatically can be carried out on a given host-asset, e.g., under the control of its LWS 109. Again, such operations can be invoked by one or more machine-language commands, e.g., one or more Java byte codes. After deployment package D_PAK(i) is created at block 516, flow can proceed to block 518.

At block 518, server 102 can send (or, in other words, push) deployment package D_PAK(i) to the given LWS 109. Flow can proceed from block 518 to block 520. At block 520 in FIG. 5, server 102 can monitor the implementation upon the given host-asset of the remediation represented by deployment package D_PAK(i).

More particularly, interaction between server 102 and the given LWS 109 can obtain more information than merely whether deployment package D_PAK(i) was installed successfully by the given LWS 109 upon its host-asset. Recalling that a remediation represents one or more operations in an automatically-machine-actionable format, it is noted that a remediation will typically include two or more such operations. LWS 109 can provide server 102 with feedback regarding, e.g., the success or failure of each such operation.

From block 520, flow proceeds to block 522, where the flow ends.

It is noted that a bracket 548 is depicted in FIG. 5 that groups together blocks 500-522. And bracket 548 points to a block diagram of a typical computer (also referred to as a PC) 550. Typical hardware components for computer 550 include a CPU/controller, an I/O unit, volatile memory such as RAM and non-volatile memory media such disk drives and/or tape drives, ROM, flash memory, etc. Bracket 548 and computer 550 are depicted in FIG. 5 to illustrate that blocks 500-502 can be carried out by computer 550, where computer 550 can correspond, e.g., to server 102, etc.

Further, the methodologies discussed above can be embodied on a machine-readable medium. Such a machine-readable medium can include code segments embodied thereon that, when read by a machine, cause the machine to perform the methodologies described above.

Of course, although several variances and example embodiments of the present invention are discussed herein, it is readily understood by those of ordinary skill in the art that various additional modifications may also be made to the present invention. Accordingly, the example embodiments discussed herein are not limiting of the present invention.

What is claimed is:

1. A host device comprising: at least one processor; at least one memory device; a network interface device;

a sensor program stored in the at least one memory device and executed by the at least one processor to: automatically assess a current state of the host device to identify a plurality of T_ID fields that each denote an identification (ID) of a technology species (T) present in the host device; automatically send information representative of the current state of the host device to a server via the network interface device including the identified plurality of T_ID fields; automatically receive, via the network interface device, vulnerability remediation information from the server, the vulnerability remediation information including:

instructions executable by the processor though the sensor program, the instructions including at least one remediation for at least one vulnerability of the host device and at least a subset of the plurality of identified T_ID fields, the at least one remediation determined by the server at least in part by AND operations comprising a first list of remediation identifications (R IDs) identified using a vulnerability identification (V ID) of the at least one vulnerability as a database index for a list of R_IDs ANDed second list of R_IDs identified using technology genus (T GEN) as an index wherein the T_GEN is determined from at least one of the T_ID fields, and further ANDed against a third R_IDs identified using the V_ID of the at least one vulnerability as an index; and for each of the T_ID fields of the subset of the plurality of the identified T_ID fields, a plurality of ACT_ID fields, wherein the content of an ACT_ID field denotes an ID of an action (ACT); and automatically implement the at least one remediation upon the host device through execution of the instructions of the received remediation information to mitigate the at least one vulnerability of the host device.

2. The host device of claim 1, wherein the sensor program is further executable by the at least one processor to:

reassess the current state of the host device following implementation of the at least one remediation on the host device; and send information representative of the reassessed current state of the host device to the server via the network interface device.

3. The host device of claim 1, wherein the host device is a printer.

4. The host device of claim 1, wherein the vulnerability remediation information includes a R_ID denoting an identification (ID) of the at least one remediation (R).

5. The host device of claim 1, where the sensor program is further executable by the at least one processor to:

receive, via the network interface device, information to be processed during the assessing of the current state of the host device, the received information identifying a particular vulnerability.

6. A method comprising: automatically assessing a current state of a host device to identify a plurality of T_ID fields that each denote an identification (ID) of a technology species (T) present in the host device; automatically sending information representative of the current state of the host device to a server via a network interface device including the identified plurality of T_ID fields;

automatically receiving, via the network interface: device, vulnerability remediation information from the server, the vulnerability remediation information including:

instructions executable by a processor of the host device though a sensor program implementing the method, the instructions including at least one remediation for at least one vulnerability of the host device and at least a subset of the plurality of identified T¯ID fields; and for each of the T ID fields of the subset of the plurality of identified T¯ID fields the at least one remediation determined by the server at least in part by AND operations comprising a first list of remediation identifications (R IDs) identified using a vulnerability identification (V ID) of the at least one vulnerability as a database index for a list of R_IDs ANDed second list of R_IDs identified using technology genus (T GEN) as an index wherein the T_GEN is determined from at least one of the T_ID fields, and further ANDed against a third R_IDs identified using the V_ID of the at least one vulnerability as an index, a plurality of ACT_ID fields, wherein the content of an ACT_ID field denotes an ID of an action (ACT);

and automatically implementing the at least one remediation upon the host device through execution of the instruction of the received remediation information to mitigate the at least one vulnerability of the host device.

7. The method of claim 6, further comprising:

reassessing the current state of the host device following implementation of the at least one remediation on the host device; and sending information representative of the reassessed current state of the host device to the server via the network interface device.

8. The method of claim 6, wherein the host device is a printer.

9. The method of claim 6, wherein the vulnerability remediation information includes a R_ID denoting an identification (ID) of the at least one remediation (R).

10. The method of claim 6, further comprising:

receiving, via the network interface device, information to be processed during the assessing of the current state of the host device, the received information identifying a particular vulnerability.

11. A machine-readable storage device, with instructions stored thereon, which when executed by at least one processor, causes a machine to perform a method comprising:

automatically assessing a current state of a host device to identify a plurality of T_ID fields that each denote an identification (ID) of a technology species (T) present in the host device; automatically sending information representative of the current state of the host device to a server via a network interface device including the identified plurality of T_D fields;

automatically receiving, via the network interface device, vulnerability remediation information from the server, the vulnerability remediation information including:

instructions executable by a processor of the host device though a sensor program implementing the method, the instructions including at least one remediation for at least one vulnerability of the host device and at least a subset of the plurality of identified T_ID fields; and for each of the T ID fields of the subset of the plurality of identified T_ID fields the at least one remediation determined by the server at least in part by AND operations comprising a first list of remediation identifications (R IDs) identified using a vulnerability identification (V ID) of the at least one vulnerability as a database index for a list of R_Ds ANDed second list of R_Ds identified using technology genus (T GEN) as a index wherein the T_GEN is determined from at least one of the T_D fields, and further ANDed against a third R_IDs identified using the V_D of the at least one vulnerability as an index, a plurality of ACT_ID fields, wherein the content of an ACT_ID field denotes an ID of an action (ACT); and automatically implementing the at least one remediation upon the host device through execution of the instruction of the received remediation information to mitigate the at least one vulnerability of the host device.

12. The machine-readable storage device of claim 11, the method further comprising:
reassessing the current state of the host device following implementation of the at least one remediation on the host device; and
sending information representative of the reassessed current state of the host device to the server via the network interface device.

13. The machine-readable storage device of claim 11, wherein the host device is a printer.

14. The machine-readable storage device of claim 11, wherein the vulnerability remediation information includes a R ID denoting an identification (ID) of the at least one remediation (R).

15. The machine-readable storage device of claim 11, the method further comprising:
receiving, via the network interface device, information to be processed during the assessing of the current state of the host device, the received information identifying a particular vulnerability.

* * * * *